March 31, 1953  J. H. ROSS  2,632,989
LAWN MOWER ATTACHMENT
Filed June 6, 1950  3 Sheets-Sheet 1

INVENTOR.
JOHN H. ROSS.
BY
McMorrow, Berman & Davidson
ATTORNEYS.

March 31, 1953 J. H. ROSS 2,632,989
LAWN MOWER ATTACHMENT
Filed June 6, 1950 3 Sheets-Sheet 2
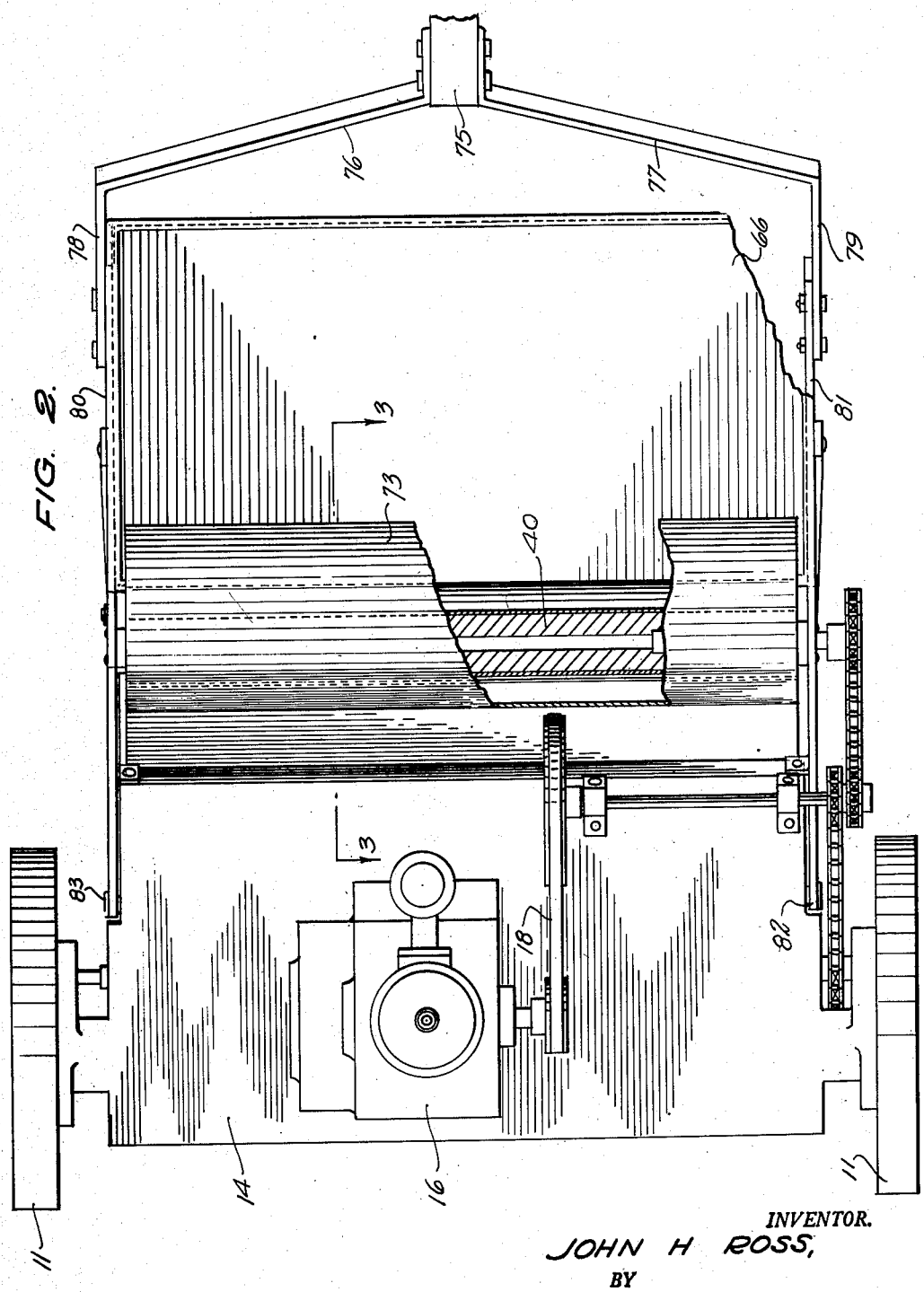
INVENTOR.
JOHN H ROSS,
BY
McMorrow, Berman & Davidson
ATTORNEYS.

March 31, 1953 J. H. ROSS 2,632,989
LAWN MOWER ATTACHMENT
Filed June 6, 1950 3 Sheets-Sheet 3
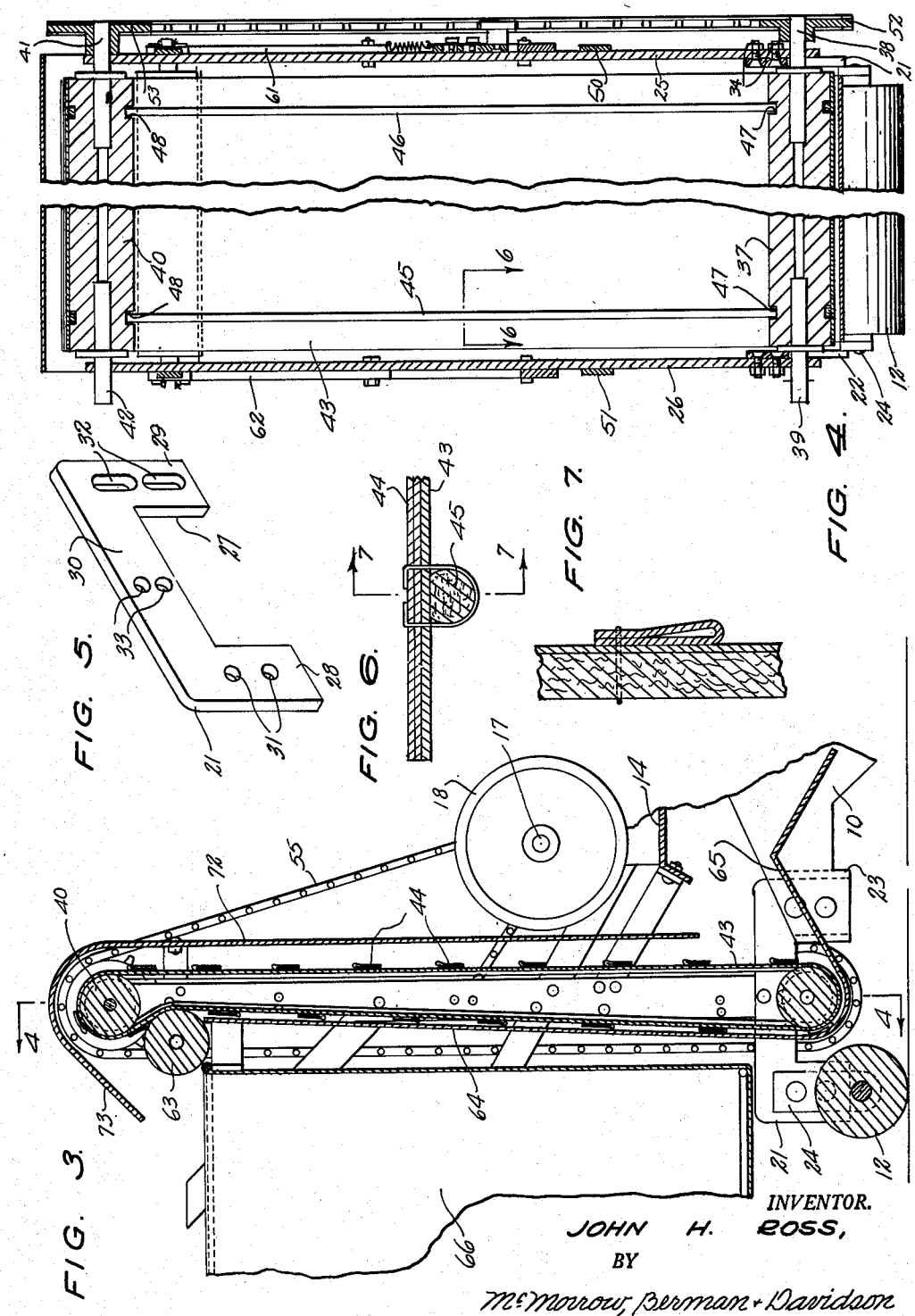
INVENTOR.
JOHN H. ROSS,
BY
McMorrow, Berman & Davidson
ATTORNEYS.

Patented Mar. 31, 1953

2,632,989

UNITED STATES PATENT OFFICE 2,632,989

LAWN MOWER ATTACHMENT

John H. Ross, Allen Park, Mich.

Application June 6, 1950, Serial No. 166,413

3 Claims. (Cl. 56—24)

This invention relates to lawn mower attachments and more particularly to an attachment for a power lawn mower to move cut grass from the cutting blade of the lawn mower and receive the cut grass in a suitable receptacle for disposal.

It is among the objects of the invention to provide an improved grass receiving attachment for a power lawn mower which can be installed on an existing power operated lawn mower with no material modification of the lawn mower construction and driven by the lawn mower power plant, which includes a receptacle of large capacity supported entirely free of the ground and power operated means for elevating the cut grass to the top of the receptacle and depositing the grass into the receptacle, which is smooth, efficient and positive in operation and does not interfere in any way with the operation of the lawn mower, and which is simple and durable in construction, economical to manufacture and install, easy to use, and not subject to malfunctioning in use.

Other objects and advantages will become apparent from a consideration of the following description and the appended claims in conjunction with the accompanying drawings wherein:

Figure 2 is a top plan view of the lawn mower and attachment illustrated in Figure 1, portions being broken away and shown in cross section to better illustrate the construction thereof;

Figure 3 is a cross sectional view on the line 3—3 of Figure 2;

Figure 4 is a fragmentary cross sectional view on the line 4—4 of Figure 3;

Figure 5 is a perspective view of an extension bracket constituting an operative component of the attachment;

Figure 6 is a cross sectional view of a conveyor belt on the line 6—6 of Figure 4; and Figure 7 is a cross sectional view of a fragmentary portion of the conveyor belt on the line 7—7 of Figure 6.

Figure 1:
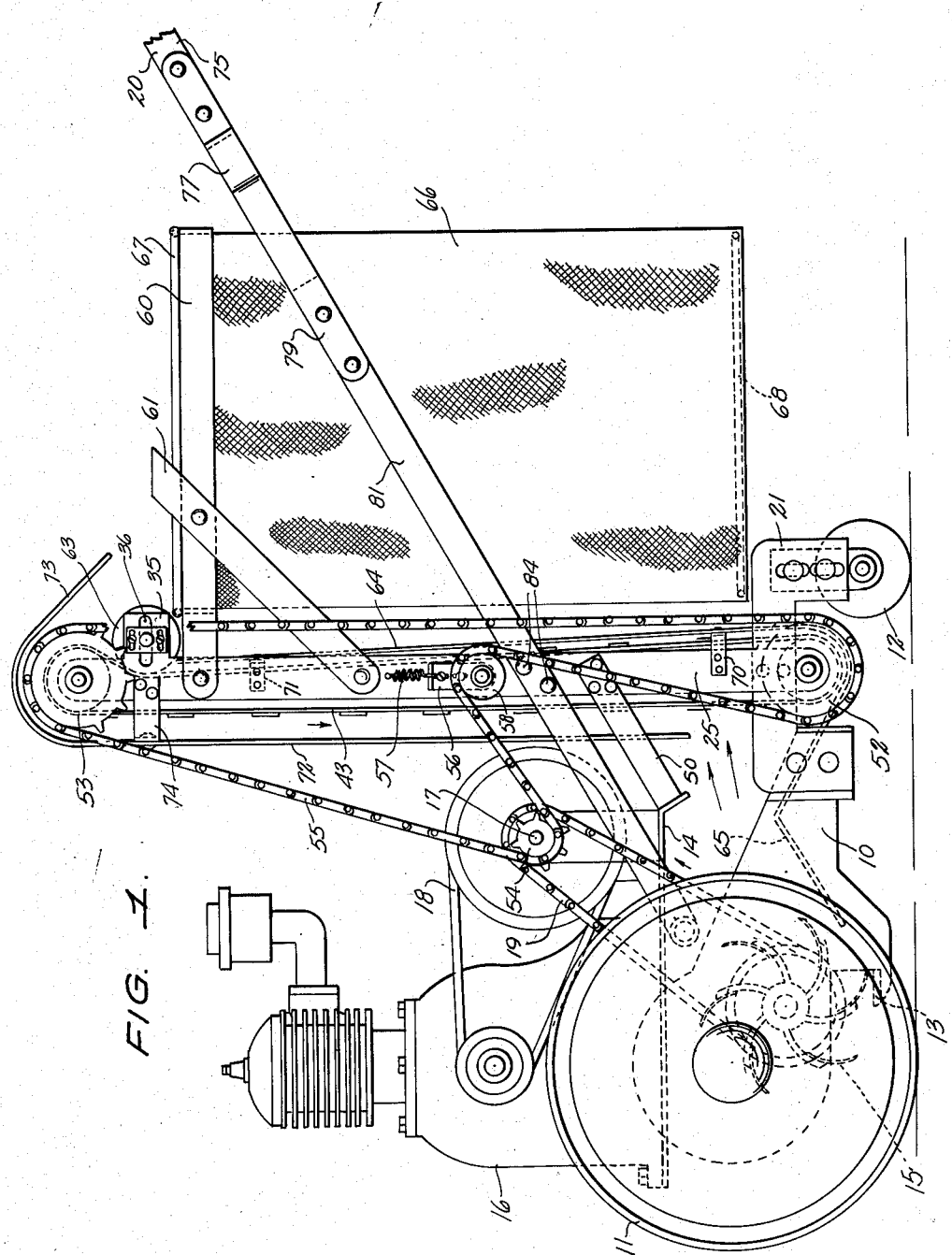
Figure 1 is a side elevational view with parts broken away of a power operated lawn mower having thereon a grass receiving attachment illustrative of the invention.

With continued reference to the drawings, the lawn mower illustrated has a frame 10 supported on wheels 11 and a ground engaging roller 12 secured to the frame rearwardly of the wheels, a cutting blade 13 carried by the frame at the lower side of the latter, a platform 14 supported on the frame above the blade 13, a cutting reel 15 journaled in the frame between the cutting blade 13 and the platform 14 and operatively engaging the blade, an engine 16 mounted on the platform, a shaft 17 journaled on the platform and driven from the engine by a speed reducing belt drive 18, and a chain drive 19 between the shaft 17 and the reel 15.

The shaft 17 is disposed substantially parallel to the blade 13 and to the rotational axis of the reel 15 and the reel may be drivingly connected to the wheels 11 by suitable gear means, not illustrated, to propel the mower. A handle 20 is disposed above and to the rear of the roller 12 and is connected to the mower frame 10 by a fork or bracket, which is extended by a special structure in the present invention.

It is to be understood that the lawn mower structure illustrated is shown merely for the purpose of illustrating the installation and operation of the lawn mower attachment and that the invention is not limited to any particular lawn mower construction, since the attachment may be applied to various power operated lawn mowers.

The attachment includes two special extension brackets 21 and 22. These brackets are generally U-shaped and are mounted in inverted position on the frame 10 for supporting the roller 12 at a location spaced from the rear end of the mower frame to more effectively support the weight of the cut grass to be carried by the attachment. Each of these brackets has one leg received in a corresponding frame socket 23 provided to receive the roller carrying leg 24 at the corresponding end of the roller and the roller carrying legs are secured to the other legs of the extension brackets so that the rollers are displaced rearwardly from their original position relative to the frame.

A standard 25 is secured at its lower end to the extension bracket 21 and projects upwardly therefrom and a corresponding standard 26 is secured at its lower end to the extension bracket 22 and projects upwardly from the latter, the two standards being disposed at respectively opposite sides of the mower frame and in spaced apart and substantially parallel relationship to each other.

As the two extension brackets 21 and 22 are substantially identical in construction and as the two standards are also substantially identical in construction, a detailed illustration and description of one extension bracket and one standard only is considered sufficient for the purposes of the present disclosure, the extension bracket 21 being illustrated in detail in Figure 5, and the standard 25 being shown in detail in Figure 1.

The extension bracket 21 may comprise a rectangular piece of metal plate having a rectangular recess or notch 27 opening to one side thereof providing two legs 28 and 29 extending perpendicularly from an intermediate portion 30 at respectively opposite ends of the latter. The leg 28 is provided with two spaced apart apertures 31 for the reception of bolts or screws by means of which the extension bracket is secured to the lawn mower frame in the frame socket provided to receive the corresponding roller receiving leg and the leg 29 is provided with two elongated apertures 32 disposed in end to end relationship to receive bolts for adjustably connecting the corresponding roller mounting leg to this leg of the extension bracket. The intermediate portion 30 is provided with two spaced apart apertures 33 for the reception of bolts 34, by means of which the lower end of the corresponding standard is secured to the extension bracket.

The standard 25 is an elongated member conveniently formed of metal plate and having substantially parallel longitudinal edges. At one end the standard is provided with two spaced apart apertures for receiving the bolts 34 and between these apertures and its adjacent end is provided with a bearing aperture for a purpose to be presently described. At its opposite end the standard is provided with a corresponding bearing aperture and near this opposite end is provided with a lateral extension 35 having an elongated slot or aperture 36 therein.

A conveyor belt roller 37 is disposed between the standards 25 and 26 at the lower ends of the standards connected to the extension brackets 21 and 22 and this roller has stub axles 38 and 39 which extend outwardly from the respectively opposite ends of the roller and are journaled in the bearing apertures at the corresponding lower end of the standards 25 and 26.

A second belt roller 40 is disposed between the standards at the ends of the latter remote from the extension brackets 21 and 22 and this roller has stub axles 41 and 42 projecting from the respectively opposite ends thereof and journaled in the bearing apertures provided at the upper ends of the standards.

An endless conveyor belt 43, preferably formed of heavy canvas, extends around the two rollers 37 and 40 and is provided at spaced apart locations therealong with transversely extending flaps 44 which are stitched to the belt and serve as slats for moving material along the belt when the belt is driven.

Two strand belts 45 and 46, preferably leather belts of circular cross sectional shape, are secured to the inner side of the conveyor belt near the respectively opposite edges of the conveyor belt and the rollers 37 and 40 are provided near their opposite ends with grooves 47 and 48 respectively which receive the belts 45 and 46 to provide an improved friction drive for the conveyor belt 43 and to maintain the conveyor belt against lateral displacement relative to the rollers.

Braces 50 and 51 extend between the rear edge of the engine platform 14 and the standards 25 and 26 respectively above the extension brackets 21 and 2 to firmly support the standards in upright position relative to the remaining components of the lawn mower.

A chain sprocket 52 is secured on the outer end of the roller stub axle 38 at the outer side of the standard 25, a corresponding chain sprocket 53 is secured on the outer end of the roller stub axle 41, and a chain sprocket 54 is secured on the shaft 17 at the outer side of the sprocket constituting a component of the reel driving chain drive 19. The two sprockets on the shaft 17 may be provided as a double sprocket, if so desired.

A drive chain 55 extends around the chain sprockets 54, 52 and 53 for driving the rollers 37 and 40 from the power driven shaft 17.

A bracket 56 is slidably mounted on the standard 25 intermediate the length of the latter and is pulled in an upward direction by a tension spring 57 connected between this bracket and the standard 25 above the bracket. A chain tightening pulley 58 is journaled on the bracket 56 and is disposed under the portion of the chain 55 between the chain sprockets 54 and 52 to maintain the chain 55 in a properly tensioned condition.

A rectangular bag supporting structure 60, preferably formed of strap iron, is secured at one side to the brackets 25 and 26 near the upper ends of the brackets but below the upper roller 40 and this structure extends substantially perpendicular to the standard from the sides of the latter remote from the cutting blade 13 and engine 16.

Two braces 61 and 62 extend diagonally between the standards 25 and 26 respectively and the corresponding sides of the bag supporting structure 60 to hold this structure in perpendicular position relative to the standards and these braces project slightly above the bag supporting structure for a purpose to be disclosed.

The bracket extensions 35 are disposed between the bag supporting structure 60 and the upper roller 40 and an idler roller 63 is journaled at its ends in these standard extensions and bears against the side of the belt 43 remote from the engine and cutting blade of the mower. This idler roller is adjustable along the slots 36 to properly tension the conveyor belt.

A plate 64 extends between the two standards 25 and 26 from a location just below the idler roller 63, under the lower belt roller 37 and has an angular extension 65 which extends from the lower belt roller substantially to the rear edge of the cutting blade 13 to receive grass cut by the reel 15 on the cutting blade and guide this grass under the lower end of the conveyor belt and into the space between the conveyor belt and the plate 64.

A grass receiving bag 66 is mounted in the bag supporting structure 60 and depends therefrom. This bag is rectangular is shape and is provided with substantially square end frames 67 and 68 formed of small metal rods and hemmed into the walls of the bag at the upper and lower ends of the bag respectively. The lower end of the bag is closed by a suitable end wall and the upper end of the bag within the frame 67 is left open. The frame 67 is slightly larger than the frame 68 to facilitate inserting the bag through the rectangular bag supporting structure 60 and the upper frame 67 is of a size to overlie the upper edge of the supporting structure 60 to suspend the bag from this structure. The ends of the braces 61 and 62 projecting above the bag supporting structure exert pressure against the sides of the upper bag frame to secure the frame in position so that it will not accidentally fall through the bag supporting structure.

With the above described construction, when the mower is in operation, grass from the cutting reel 15 will fall onto the extension 65 of the plate 64 and will slide into the space between the lower end of the belt 43 and the portion of the plate 64 curved under this lower end of the belt, the extension 65 comprising two portions relatively inclined to each other to facilitate the passage of the cut grass from the reel 15 and cutting blade 13 to the lower end of the conveyor belt. When the grass comes into contact with the conveyor belt it will be engaged by the transverse flaps or slats 44 and moved upwardly of the plate 64 to the upper end of this plate and from the upper end of the plate 64 between the belt and the idler roller 63 and over the idler roller into the open upper end of the bag 66, as indicated by the arrow in Figure 1.

The plate 64 is supported from the standards 25 and 26 by suitable clips or brackets, as indicated at 70 and 71 in Figure 1, and the angular extension 65 of this plate is suitably secured at its edges to the mower frame 10.

A shield or guard plate 72 is spaced from the side of the belt 43 adjacent the mower engine 16 and extends for the full width of the belt and from a bottom location adjacent the rear edge of the engine platform 14 over the top of the upper roller 40 and the upper end of the conveyor belt. At its upper end this guard plate is curved over the upper roller and is provided with a rearwardly and downwardly projecting extension 73 which overlies the idler roller 63 and directs the cut grass into the upper end of the bag 66. This guard plate is mounted on the standards 25 and 26 by suitable brackets, as indicated at 74 in Figure 1 and serves as a windshield to prevent cut grass from falling onto the engine disposed immediately in front of the attachment and also to prevent the cut grass from being blown rearwardly and against the person operating the lawn mower.

The handle 20 comprises a tongue 75, as particularly illustrated in Figure 2, and the original fork comprises two legs 76 and 77 extending in respectively opposite directions from the corresponding end of the tongue and having at their outer ends angular extensions 78 and 79 respectively apertured for connection to the mower frame.

In installing the attachment of the present invention the tongue 75 is shortened and extension bars 80 and 81 are connected to the end portions 78 and 79 of the original handle fork and extend to the pivotal connections 82 and 83 on the mower frame for attaching the handle to the mower. These extension bars 80 and 81 are spaced apart so that they extend past the sides of the bag 66 and past the outer sides of the standards 25 and 26. These bars are preferably secured to the standards by suitable means such as the rivets indicated at 84 in Figure 1. The handle is disposed immediately at the rear side of the grass receiving bag 66 and provides full steering control for the motor without interfering in any way with the grass receiving attachment of the present invention.

In installing the attachment of the present invention on a power operated lawn mower, all of the original parts of the mower are retained and used, the only element discarded being a portion of the mower tongue. The attachment itself comprises a minimum number of simple parts and is rigidly mounted on the mower so that it does not create any difficulty in the operation of the mower, and in a manner such that it does not interfere in any way with the normal operation of the mower.

The bag 66 is of large capacity and is supported entirely clear of the ground so that it does not drag over the grass or resist forward movement of the mower and requires emptying at only infrequent intervals.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a lawn mower having a wheel supported frame, a platform mounted on said frame, a power plant mounted on said platform, a shaft journaled on said platform and driven by said power plant, a cutting blade carried by said frame below said platform, a cutting reel journaled in said frame between said blade and said platform, a ground engaging roller carried by said frame at a location spaced from said cutting blade, and a handle disposed above said roller and to the side thereof remote from said blade, a grass receiving attachment for said lawn mower comprising two extension brackets disposed one between each end of said roller and said frame, two standards connected each at one end to a corresponding extension bracket, said standards projecting upwardly from said extension brackets and spaced apart in substantially parallel relationship to each other, two rollers disposed between said standards and journaled therein one at the lower and one at the upper ends of said standards, an endless belt extending around both of said rollers, a chain sprocket on said shaft, a chain sprocket on each of said rollers, a drive chain extending around said chain sprockets for driving said rollers from said shaft, a flat plate extending between said standards at the side of said belt remote from said reel and from a location below the upper roller under the lower roller, said plate having an angular extension extending from said lower roller substantially to said cutting blade to receive cut grass from said blade and guide such brass below said lower roller and into the space between said plate and said belt, a bag supporting structure secured to said standards below said upper roller and extending from the sides of said standards remote from said blade, a bag having an open end supported at its open end on said structure and depending therefrom, an idler roller journaled on said standards between said upper roller and said bag supporting structure and at the side of said belt remote from said blade for directing cut grass from said belt into the open upper end of said bag, and two extension bars extending between said handle and said frame, said extension bars being secured at corresponding ends to said handle and at their other ends to said frame at respectively opposite ends of the latter and extending past said bag and said standards.

2. In combination with a lawn mower having a wheel supported frame, a platform mounted on said frame, a power plant mounted on said platform, a cutting reel journaled in said frame and driven by said power plant, a ground engaging roller carried by said frame at a location spaced from said reel, and a handle pivotally connected at one end to said frame and extending from said frame above said roller, a grass receiving attachment for said lawn mower comprising a pair of spaced apart and vertically disposed standards mounted at their lower ends on said frame adjacent said ground engaging roller and extending upwardly from the frame, belt rollers disposed between and journaled on said standards one near the upper ends and one near the lower ends of the standards, an endless conveyor belt entrained over said rollers between said standards, means drivingly connecting said power plant to one of said rollers, a plate disposed adjacent the side of said belt remote from said cutting reel and extending from a location adjacent the uppermost of said rollers along said belt and under the lowermost of said rollers, said plate having an extension projecting below the lowermost of said rollers toward said reel and said belt being driven in a direction to move upwardly along said plate, a bag supporting structure mounted on said standards below and adjacent to said uppermost belt roller and extending from the sides of said standards adjacent said plate toward said handle, and a belt tightening roller journaled on said standards and bearing against the surface of said belt adjacent said plate immediately below said uppermost belt roller to tighten said belt and simultaneously assist in the discharge of material from the portion of said belt extending around said uppermost roller through said bag supporting structure.

3. In combination with a lawn mower having a wheel supported frame, a platform mounted on said frame, a power plant mounted on said platform, a cutting reel journaled in said frame and driven by said power plant, a ground engaging roller carried by said frame at a location spaced from said reel, and a handle pivotally connected at one end to said frame and extending from said frame above said roller, a grass receiving attachment for said lawn mower comprising a pair of spaced apart and vertically disposed standards mounted at their lower ends on said frame adjacent said ground engaging roller and extending upwardly from the frame, belt rollers disposed between and journaled on said standards one near the upper ends and one near the lower ends of the standards, an endless conveyor belt entrained over said rollers between said standards, means drivingly connecting said power plant to one of said rollers, a plate disposed adjacent the side of said belt remote from said cutting reel and extending from a location adjacent the uppermost along said belt and under the lowermost of said rollers, said plate having an extension projecting below the lowermost of said rollers toward said reel and said belt being driven in a direction to move upwardly along said plate, a bag supporting structure mounted on said standards below and adjacent to said uppermost belt roller and extending from the sides of said standards adjacent said plate toward said handle, a belt tightening roller journaled on said standards and bearing against the surface of said belt adjacent said plate immediately below said uppermost belt roller to tighten said belt and simultaneously assist in the discharge of material from the portion of said belt extending around said uppermost roller through said bag supporting structure, and a shield secured to said standards and extending along the side of said conveyor belt remote from said plate and from a location near said lowermost to said uppermost roller and being curved over said uppermost roller and said belt tightening roller to assist in directing material discharged from the portion of said belt extending around said uppermost roller through said bag supporting structure.

JOHN H. ROSS.

REFERENCES CITED

The following references are of record in the file of this patent:

UNITED STATES PATENTS

| Number | Name | Date |
| --- | --- | --- |
| 435,389 | Braithwaite | Sept. 2, 1890 |
| 600,005 | Kreider | Mar. 1, 1898 |
| 1,060,283 | Phillips | Apr. 29, 1913 |
| 1,248,382 | Neuman | Nov. 27, 1917 |
| 1,597,367 | McConnell | Aug. 24, 1926 |